(12) United States Patent
Nishii et al.

(10) Patent No.: US 6,796,923 B2
(45) Date of Patent: Sep. 28, 2004

(54) TOROIDAL-TYPE CONTINUOUSLY VARIABLE TRANSMISSION

(75) Inventors: Hiroki Nishii, Kanagawa (JP); Nobuo Goto, Kanagawa (JP)

(73) Assignee: NSK Ltd., Tokyo (JP)

( * ) Notice: Subject to any disclaimer, the term of this patent is extended or adjusted under 35 U.S.C. 154(b) by 22 days.

(21) Appl. No.: 10/194,261

(22) Filed: Jul. 15, 2002

(65) Prior Publication Data

US 2003/0050148 A1 Mar. 13, 2003

(30) Foreign Application Priority Data

Jul. 19, 2001 (JP) ...................................... P.2001-219471

(51) Int. Cl.⁷ .............................................. F16H 15/38
(52) U.S. Cl. .......................... 476/40; 476/42; 403/327; 403/376
(58) Field of Search .............................. 403/326, 327, 403/375, 376; 476/40, 42, 46; 411/353, 517

(56) References Cited

U.S. PATENT DOCUMENTS

| 1,179,060 A | * | 4/1916 | Williamson ................. 403/375 |
| 3,812,756 A | * | 5/1974 | Wenger ....................... 411/353 |
| 4,280,726 A | * | 7/1981 | McCoag ...................... 292/327 |
| 4,650,363 A | * | 3/1987 | Kehl et al. .................. 403/140 |
| 6,238,318 B1 | | 5/2001 | Itoh et al. |

FOREIGN PATENT DOCUMENTS

| JP | 2595141 | 2/1994 |
| JP | 6280957 | 10/1994 |
| JP | 11241754 | 9/1999 |

* cited by examiner

Primary Examiner—William C. Joyce
(74) Attorney, Agent, or Firm—Sughrue Mion, PLLC

(57) ABSTRACT

An output side disk 3 includes a penetration hole 30 for penetration of an input shaft therethrough, and a securing groove 40 formed in the inner peripheral surface of the penetration hole 30 for preventing a needle roller bearing 5 from slipping out in the axis O direction of the input shaft. The first connecting portion R3 of the securing groove 40 is formed as a surface the section of which has an arc-like shape of a large radius of curvature, whereas the second connecting portion R4 of the securing groove 40 is formed as a surface the section of which has an arc-like shape of a small radius of curvature.

10 Claims, 7 Drawing Sheets

TOROIDAL-TYPE CONTINUOUSLY VARIABLE TRANSMISSION

BACKGROUND OF THE INVENTION

The present invention relates to a toroidal-type continuously variable transmission which can be used as a transmission for a car.

Now, FIG. 4 shows a conventional toroidal-type continuously variable transmission which can be used as a transmission for a car. This is a toroidal-type continuously variable transmission of a so-called double cavity type which has a structure designed for high torque. This conventional toroidal-type continuously variable, transmission is structured such that two input side disks 2, 2 and two output side disks 3, 3 are mounted on the outer periphery of an input shaft 1. Also, an output gear 4 is rotatably supported on the outer periphery of the middle portion of the input shaft 1. The two output side disks 3 and 3 are respectively connected by spline engagement to cylindrical-shaped flange portions 4a and 4a formed in the central portion of the output gear 4.

By the way, the input shaft 1 can be driven or rotated by a drive shaft 22 through a pressing device 12 of a loading cam type interposed between the input side disk 2 situated on the left side in FIG. 3 and a cam plate 7. Also, the output gear 4 is supported within a housing 14 through a partition wall 13 which is composed of two members connected together, whereby the output gear 4 can be rotated about the axis O of the input shaft 1 but is prevented from shifting in the axis O direction.

The output side disks 3 and 3 are supported in such a manner that they can be rotated about the axis O of the input shaft 1 by their respective needle roller bearings 5 and 5 interposed between the input shaft 1 and output side disks 3, 3. On the other hand, the input side disks 2 and 2 are supported on the two end portions of the input shaft 1 through their respective ball splines 6 and 6 in such a manner that they can be rotated together with the input shaft 1. Also, as shown in FIG. 7 as well, power rollers 11 are rotatably held by and between the inner surfaces (concave surfaces) 2a, 2a of the respective input side disks 2, 2 and the inner surfaces (concave surfaces) 3a, 3a of the respective output side disks 3, 3.

Between the input side disk 2 situated on the left side in FIG. 4 and cam plate 7, there is interposed a first countersunk plate spring 8; and, between the input side disk 2 situated on the right side in FIG. 4 and loading nut 9, there is interposed a second countersunk plate spring 10. These countersunk plate springs 8 and 10 apply pressing forces to the mutual contact portions between the concave surfaces 2a, 2a, 3a, 3a of the respective disks 2, 2, 3, 3 and the peripheral surfaces 11a, 11a (see FIG. 7) of the power rollers 11, 11.

Therefore, in the continuously variable transmission having the above structure, in case where a rotational force is input into the input shaft 1 from the drive shaft 22, the two input side disks 2 and 2 are rotated integrally with the input shaft 1, and the rotational movements of the input side disks 2 and 2 are transmitted by the power rollers 11 and 11 to the output side disks 3 and 3 at a given transmission ratio. Also, the rotational movements of the output side disks 3 and 3 are transmitted from the output gear 4 to an output shaft 17 through a transmission gear 15 and a transmission shaft 16.

By the way, in the thus structured continuously variable transmission, generally, in order to prevent the needle roller bearing 5, which supports the output disk 3 rotatably, from shifting in the axis O direction of the input shaft 1 and thus slipping out of its given position, there is disposed slippage preventive means for preventing the slippage of the needle roller bearing 5.

Here, FIG. 5 shows a conventional example of such needle roller bearing 5 slippage preventive means (see JP-A-11-166605). As shown in FIG. 5, the slippage preventive means is composed of a retaining ring (slippage preventive member) 18; and, specifically, the retaining ring 18 has a substantially rectangular section shape and is fitted into and secured to a ring-shaped securing groove 3b formed in the inner peripheral surface of the output side disk 3 (that is, the peripheral surface of a stepped-penetration hole 30 formed in the output side disk 3). That is, the retaining ring 18 prevents the needle roller bearing 5 from shifting in the axis O direction (that is, from slipping off the output side disk 3).

Also, as shown in FIG. 6, the ball spline 6 supporting the input side disk 2 includes a first ball spline groove 31 (see FIG. 4) formed in the outer peripheral surface of the input shaft 1, a second ball spline groove 32 formed in the inner peripheral surface of the input side disk 2 (the peripheral surface of a penetration hole 43 formed in the input side disk 2), and a plurality of balls 33 rollably interposed between the first and second ball spline grooves 31 and 32. And, in order to prevent the balls 33 from slipping in the axial direction of the input shaft 1, there is disposed slippage preventive means which is used to prevent the balls 33 against slippage.

Such slippage preventive means, for example, as shown in FIG. 6, is composed of a retaining ring (slippage preventive member) 35 having a circular-shaped section which is fitted into and secured to a ring-shaped securing groove 2b formed in the inner peripheral surface of the input side disk 2; that is, the retaining ring 35 prevents the balls from shifting in the axis O direction of the input shaft 1 (namely, from slipping out of the input side disk 2).

By the way, as can be seen from FIG. 5, the conventional retaining ring 18 is structured such that its section has a substantially rectangular shape and, therefore, the securing groove 3b, to which the retaining ring 18 is to be secured, is also structured such that its section has a substantially rectangular shape. That is, when observing the securing groove 3b through its section shown in FIG. 5 (b), the securing groove 3b includes a bottom surface (groove bottom) p and two side surfaces q, q which extend from the bottom surface p toward the penetration hole 30 of the output side disk 3; and, the bottom surface p is formed linear (straight) and, at the same time, the bottom surface p and two side surfaces q, q are connected to each other through their respective arc-shaped surfaces the sections of which respectively have a small radius of curvature.

Also, as can be understood from FIG. 6, in the case of the conventional retaining ring 35, its section has a circular shape and, therefore, the securing groove 2b for securing the retaining ring 35 thereto is also structured such that its section has a circular shape. That is, when observing the securing groove 2b through its section shown in FIG. 6(b), the bottom surface r and two side surfaces s, s of the securing groove 2b are continuously connected together as a surface the section of which has an arc-like shape.

However, as shown in FIG. 5(b), in case where the two corners R1, R1 of the groove bottom of the securing groove 3b, that is, the two connecting portions R1, R1 between the bottom surface p and two side surfaces q, q are respectively formed as a surface the section of which has an arc shape with a small radius of curvature, when, as shown in FIG. 7, in order to increase a transmission ratio, the power roller 11 is shifted and a force in the arrow mark F direction is thereby applied to the securing groove 3b, stresses are concentrated on the groove bottom of the securing groove 3b, especially, on the corner portions (connecting portions) R1, R1. Therefore, there is a fear that, when transmitting high torque, the yield strength of the output side disk 3 can be short.

On the other hand, as shown in FIG. 6(b), in case where the bottom surface r and two side surfaces s, s of the securing groove 2b are formed as a continuous arc-shaped surface and thus the two connecting portions R2, R2 are each formed as an arc-shaped surface having a large radius of curvature, even when a force from the power roller 11 is applied to the securing groove 2b, stresses acting on the two corner portions R2, R2 of the securing groove 2b can be dispersed and released, thereby being able to enhance the yield strength of the input side disk 2. However, when the ball 33 collides with the retaining ring 35, since the area of the side surface q of the securing groove 2b, which intersects at right angles to the moving direction (axis O direction) of the ball 33 and is used to receive the retaining ring 35, is small, the retaining ring 35 is easy to slip out of the securing groove 2b.

SUMMARY OF THE INVENTION

The present invention aims at eliminating the drawbacks found in the above-mentioned conventional toroidal-type continuously variable transmission. Accordingly, it is an object of the invention to provide a toroidal-type continuously variable transmission which not only can ease concentration of stresses on the securing groove to which the slippage preventive member for a needle roller bearing or for the ball of a ball spline is to be secured, but also can make it difficult for the slippage preventive member to slip out of the securing groove.

In attaining the above object, according to a first aspect of the invention, there is provided a toroidal-type continuously variable transmission, comprising:

an input shaft to which a rotational force is input;

a first disk disposed concentric with the input shaft and including a penetration hole formed in a central portion thereof, the first disk acting as one of input side disk and output side disk, the input shaft passing through the penetration hole;

a needle roller bearing interposed between the input shaft and the first disk for rotatably supporting the first disk;

a slippage preventive member secured to an inner peripheral surface of the penetration hole formed in the first disk, for preventing the needle roller bearing from slipping out in an axial direction of the input shaft; and, a securing groove formed in the inner peripheral surface of the penetration hole formed in the first disk, for securing the slippage preventive member thereto.

In the first aspect of the present invention, the securing groove includes first and second side surfaces opposed to each other and a bottom surface interposed between the first and second side surfaces so as to define a substantially U-shape in a cross section of the securing groove. Further, the securing groove further includes, a first connecting portion with a cross section thereof having an arc-like shape for connecting the bottom surface with one of the side surfaces that is situated on the needle roller bearing side, and a second connecting portion with a cross section thereof having an arc-like shape for connecting the bottom surface with the other of side surfaces. Moreover, the radius of curvature of the first connecting portion is larger than the radius of curvature of the second connecting portion.

In addition, the above-mentioned object can also be achieved by a toroidal-type continuously variable transmission, according to the second aspect of the present invention comprising:

an input shaft to which a rotational force is input;

an input side disk rotatable integrally with the input shaft;

an output side disk disposed concentric with and opposed to the input side disk;

a ball spline for supporting the input side disk on an outer peripheral surface of the input shaft, the ball spline including a first ball spline groove formed in the outer peripheral surface of the input shaft, a second ball spline groove formed in an inner peripheral surface of the input side disk, and a plurality of balls rollably interposed between the first and second ball spline grooves;

a slippage preventive member for preventing the balls from slipping out in an axial direction of the input shaft;

a securing groove formed in the input shaft or in the input side disk, for securing the slippage preventive member thereto.

In the second aspect of the present invention, the securing groove includes first and second side surfaces opposed to each other and a bottom surface therebetween so as to define a substantially U-shape in a cross section of the securing groove. The securing groove includes a first connecting portion with a cross section thereof having an arc-like shape for connecting the bottom surface with one of the side surfaces that is situated on the ball spline groove side, and a second connecting portion with the section thereof having an arc-like shape for connecting the bottom surface with the other of the side surfaces. The radius of curvature of the first connecting portion is larger than the radius of curvature of the second connecting portion.

According to the first and second aspects of the present invention, stresses acting on the securing groove are dispersed and released along the arc-shaped surface having a large radius of curvature of the first connecting portion of the securing groove. Therefore, concentration of the stresses on the first connecting portion of the securing groove can be eased, thereby being able to enhance the yield strength of the output side disk, input side disk or input shaft.

On the other hand, in the case of the second connecting portion of the securing groove that is situated on the opposite side to the needle roller bearing or to the ball of the ball spline, since it is formed as an arc-shaped surface having a small radius of curvature, the area of the side surface thereof, which intersects at right angles to the moving direction of the needle roller bearing or the ball of the ball spline and is used to receive the slippage preventive member when the needle roller bearing or the ball is collided with the slippage preventive member, is wide. As a result of this, the slippage preventive member can be made difficult to slip out of the securing groove.

Also, according to a toroidal-type continuously variable transmission of the invention, the section shape of the portion of the slippage preventive member to be inserted into the securing groove is formed substantially coincident with the section shape of the securing groove, and the slippage preventive member is fitted with and secured to the securing groove in such a manner that the outer peripheral surface of the insertion portion of the slippage preventive member is substantially coincident with the inner peripheral surface of the securing groove. This makes it more difficult for the slippage preventive member to slip out of the securing groove.

DETAILED DESCRIPTION OF THE PREFERRED EMBODIMENTS

Now, description will be given below of a preferred embodiment of a toroidal-type continuously variable transmission according to the invention with reference to the accompanying drawings. By the way, the invention is characterized by an improvement in the shape of a securing groove to which a slippage preventive member for prevention of slippage of a needle roller bearing or the ball of a ball spline is to be secured; and, the remaining structures and operations of the invention are similar to the abovementioned conventional structures and operations. Therefore, in the following, description will be given only of the characteristic portions of the invention, whereas the remaining parts thereof are given the same designations as in FIGS. 4 to 7 and thus the detailed description thereof is omitted below.

Figure 1:
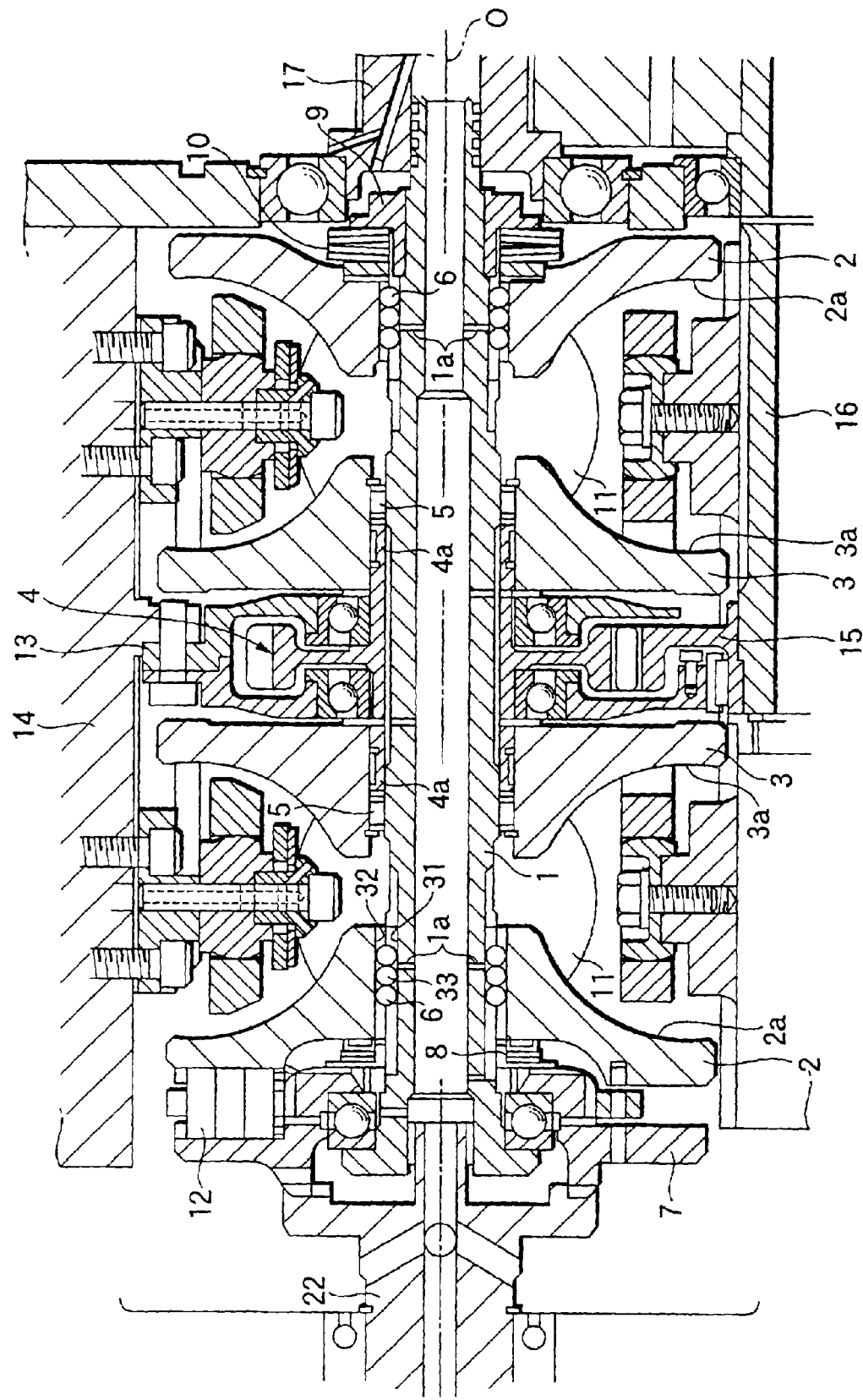
FIG. 1 is a section view of a toroidal-type continuously variable transmission according to an embodiment of the invention.
Figure 2A:
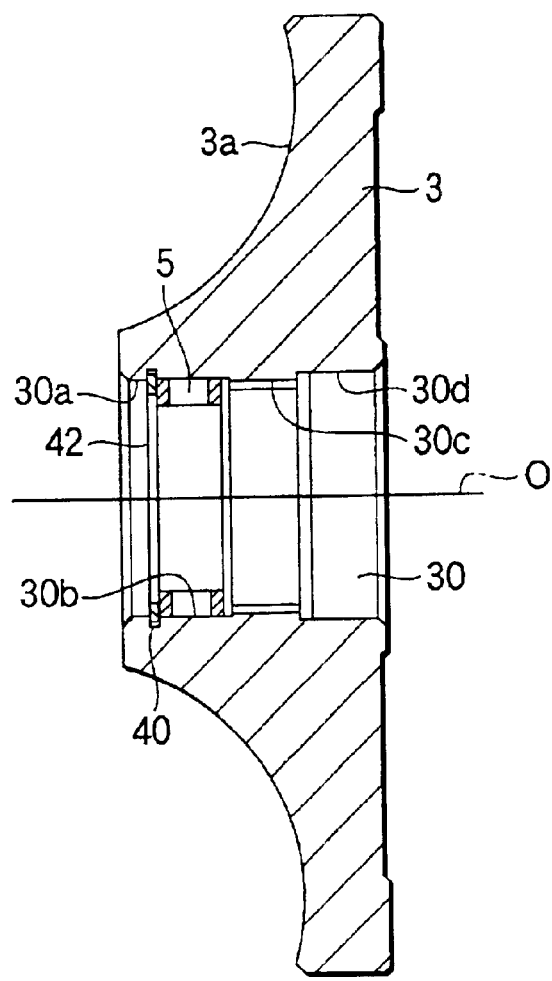
FIG. 2(a) is an enlarged section view of an output side disk employed in the toroidal-type continuously variable transmission shown in FIG. 1.
Figure 2B:
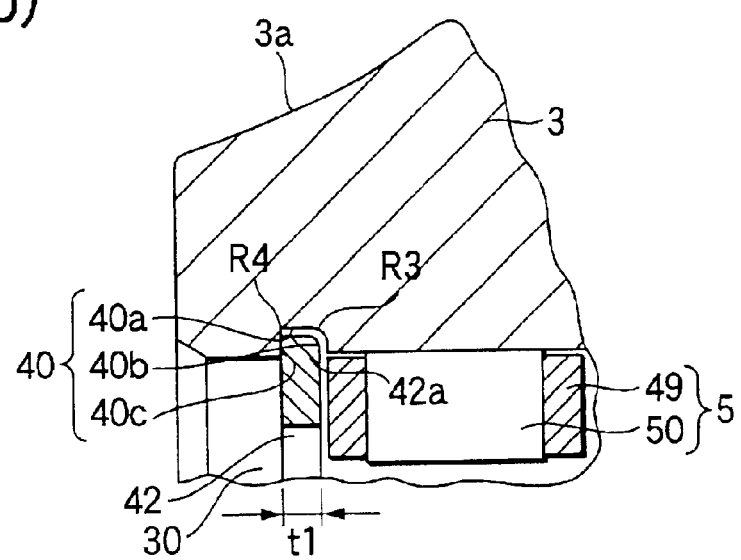
FIG. 2(b) is an enlarged section view of the output side disk shown in FIG. 2(a)
Figure 3A:
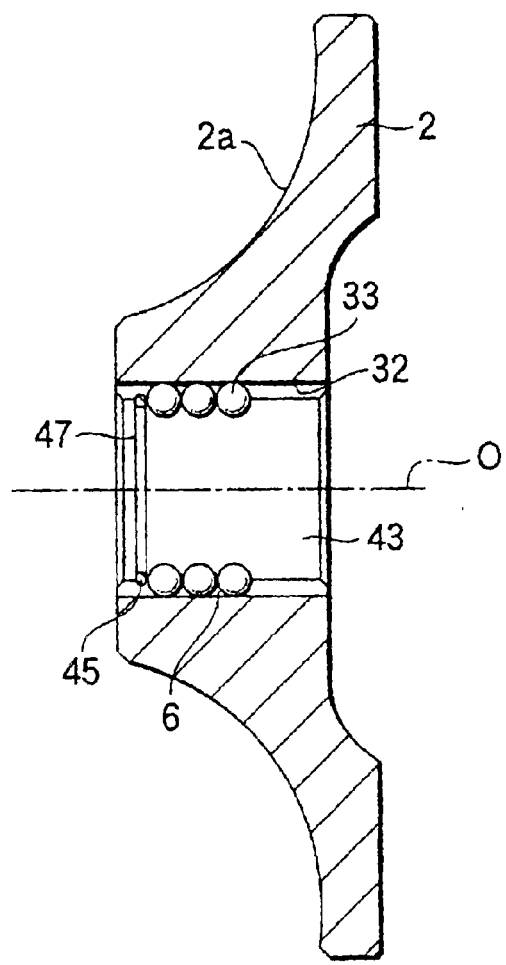
FIG. 3(a) is an enlarged section view of an input side disk employed in the toroidal-type continuously variable transmission shown in FIG. 1.

FIGS. 1 to 3 show a section view of an embodiment of a toroidal-type continuously variable transmission according to the invention. As shown in FIG. 1, a toroidal-type continuously variable transmission of a double cavity type designed for high torque according to the present embodiment comprises two output side disks 3, 3 and two input side disks 2, 2.

As shown enlargedly in FIG. 2, each of the two output side disks 3 is formed by forging hard metal such as bearing steel, while the section of the side surface 3a of the disk 3, which is disposed opposed to a power roller 11, has an arc-like shape. Also, in the central portion of the output side disk 3, there is formed a penetration hole 30 which penetrates through the output side disk 3 and extends in the axial direction thereof and also the section of which has a circular shape.

The thus structured output side disk 3, as shown in FIG. 1, is rotatably supported on the outer periphery of substantially the middle portion of an input shaft 1 which is a rotary shaft. Therefore, on the inner peripheral surface of the penetration hole 30, there is disposed a needle roller bearing 5 which is a radial rolling bearing.

As shown in FIG. 2, the penetration hole 30 comprises a left end portion 30a which is the end portion of the hole 30 situated on the power roller side, a cylindrical portion 30b connected continuously with the left end portion 30a, a female spline portion 30c connected continuously with the cylindrical portion 30b, and a right end portion 30d connected continuously with the female spline portion 30c. Of these portions, in the cylindrical portion 30b, there is disposed the needle roller bearing 5. The needle roller bearing 5 comprises a plurality of needle rollers 50 each having a rolling surface to be contacted with the outer peripheral surface of the input shaft 1, and a retainer 49 for holding the needle rollers 50 in such a manner that the rollers 50 are free to roll. Also, the female spline portion 30c is engaged with a male spline portion which is formed in each of the flange portions 4a, 4a of an output gear 4. Due to this, the output side disk 3 and output gear 4 are allowed to rotate synchronously with each other. Also, the right end portion 30d, in a state where the female spline portion 30c is engaged with the male spline portion, is closely fitted with the outer surface of the middle portion of the flange portion 4a situated near to the center thereof to allow the center axis of the flange portion 4a to coincide with the center axis of the output side disk 3.

Also, between the left end portion 30a and cylindrical portion 30b, there is formed a ring-shaped securing groove 40. Into the securing groove 40, there is fitted and secured a slippage preventive member such as a retaining ring 42 which prevents the needle roller bearing 5 from shifting in the axial O direction and thus slipping out of its given position. The retaining ring 42, specifically, prevents the needle roller bearing 5 from slipping out of the inside of the cylindrical portion 30b to the left end portion 30a side. By the way, slippage prevention of the needle roller bearing 5 from the inside of the cylindrical portion 30b to the right end portion 30d side is attained by mutual engagement between the retainer 49 and the edge portion of the female spline portion 30c.

As shown enlargedly in FIG. 2(b), the securing groove 40 includes a bottom surface (groove bottom) 40a the section of which has a linear shape extending along the axis O, and side surfaces 40b, 40c which intersect at right angles to the bottom surface 40a and extend linearly toward the penetration hole 30 of the output side disk 3. A first connecting portion R3, which connects together the bottom surface 40a of the securing groove 40 and the side surface 40b situated on the needle roller bearing 5 side, is formed as an arc-shaped surface the section of which has a large radius of curvature. On the other hand, a second connecting portion R4, which connects together the bottom surface 40a of the securing groove 40 and the side surface 40c opposed to the side surface 40b, is formed as an arc-shaped surface the section of which has a small radius of curvature. In the present embodiment, the radius of curvature of the second connecting portion R4 is set 0.3 to 0.8 times the width t1 of the securing groove 40. That is, the radius of curvature of the first connecting portion R3 is larger than the radius of curvature of the second connecting portion R4.

Also, the retaining ring 42 to be fitted into and secured to the thus structured securing groove 40 is structured as follows: that is, the section shape of its insertion portion 42a to be inserted into the securing groove 40, in order to be coincident with the section shape of the securing groove 40, is formed as an arc-shaped surface which is structured such that its side to be fitted with the first connecting portion R3 of the securing groove 40 has a large radius of curvature, whereas its side to be fitted with the second connecting portion R4 has a small radius of curvature. Therefore, the outer peripheral surface of the insertion portion 42a of the retaining ring 42 can be fitted with and secured to the inner peripheral surface of the securing groove 40 with little clearance between them.

Also, the mutual fit between the securing groove 40 and retaining ring 42 may not be perfect engagement. For example, the portion of the retaining ring 42 to be fitted with the first connecting portion R3 of the securing groove 40 may not have an arc-like shape but may be chamfered so as to be almost perfectly engaged with the securing groove 40.

On the other hand, as shown enlargedly in FIG. 3, each of the two input side disks 2 is formed by forging hard metal such as bearing steel, while the section of the side surface 2a opposed to the power roller 11 has an arc-like shape. Also, in the central portion of the input side disk 2 as well, there is formed a penetration hole 43 which penetrates through the input side disk 2 in the axial direction thereof and also the section of which has a circular shape.

The input side disk 2, as shown in FIG. 1, is supported through the ball spline 6 in such a manner that it can be rotated together with the input shaft 1 and can be shifted in the axial direction of the input shaft 1. The ball spline 6 includes a first ball spline groove 31 formed in the outer peripheral surface of the input shaft 1, a second ball spline groove 32 formed in the inner peripheral surface of the input side disk 2, and a plurality of balls 33 rollably interposed between the first and second ball spline grooves 31 and 32 (see FIG. 3).

Figure 3B:
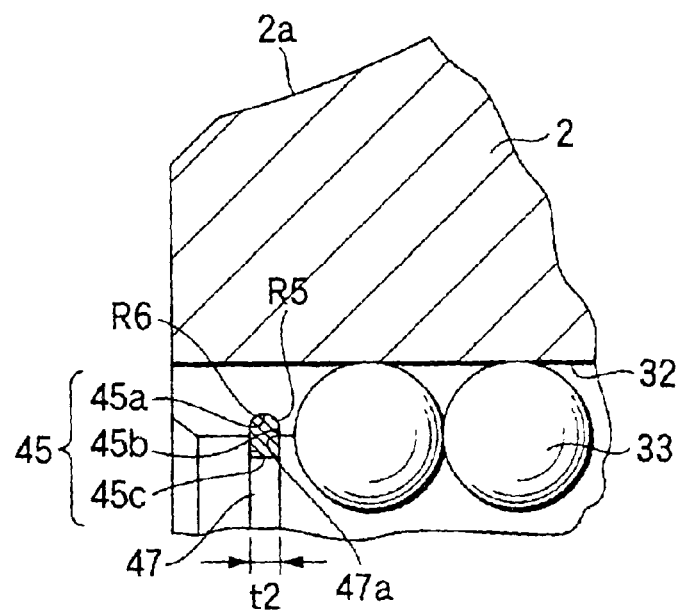
FIG. 3(b) is an enlarged section view of the input side disk shown in FIG. 3(a)
Figure 4:
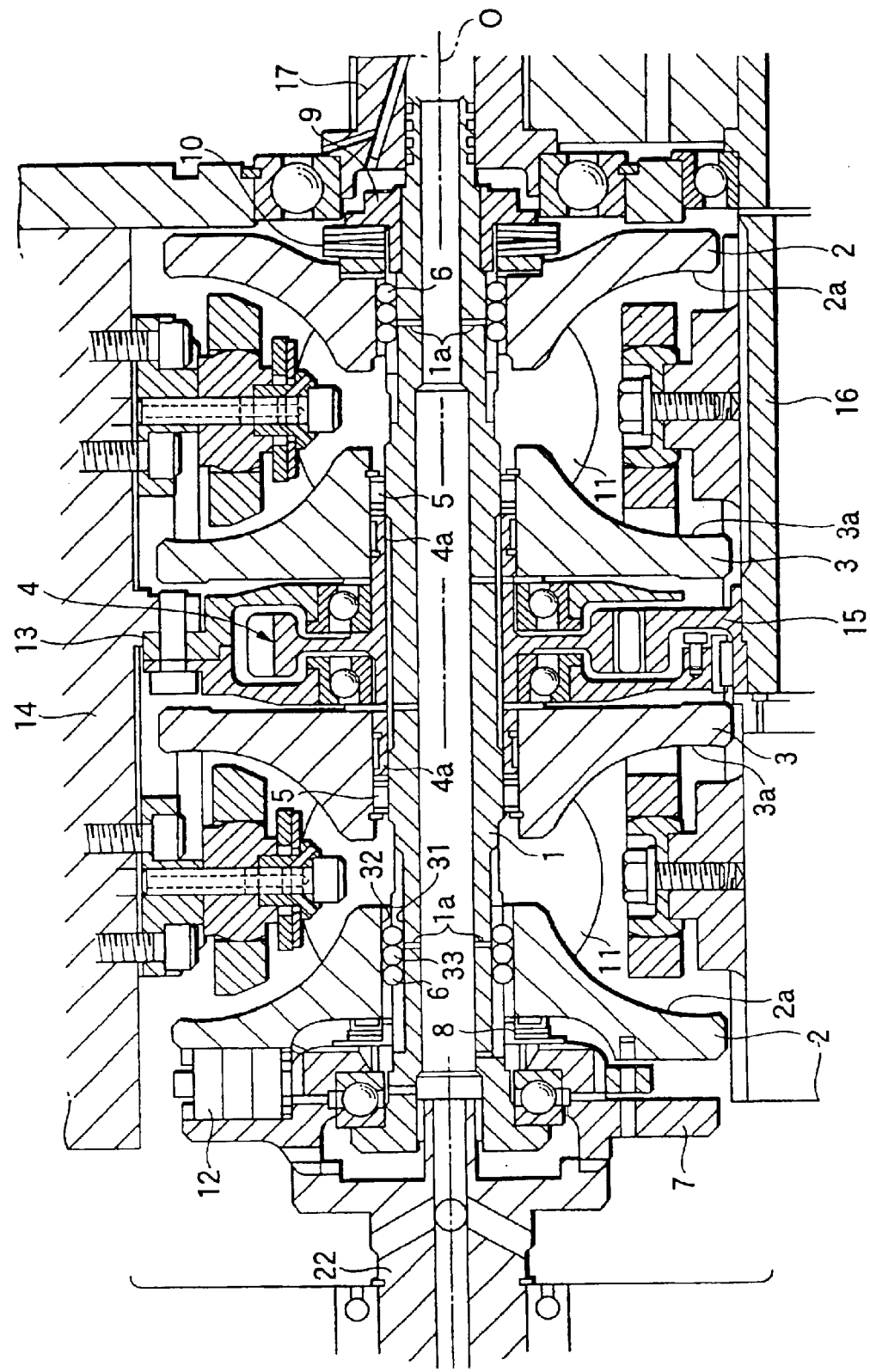
FIG. 4 is a section view of a conventional toroidal-type continuously variable transmission.
Figure 5A:
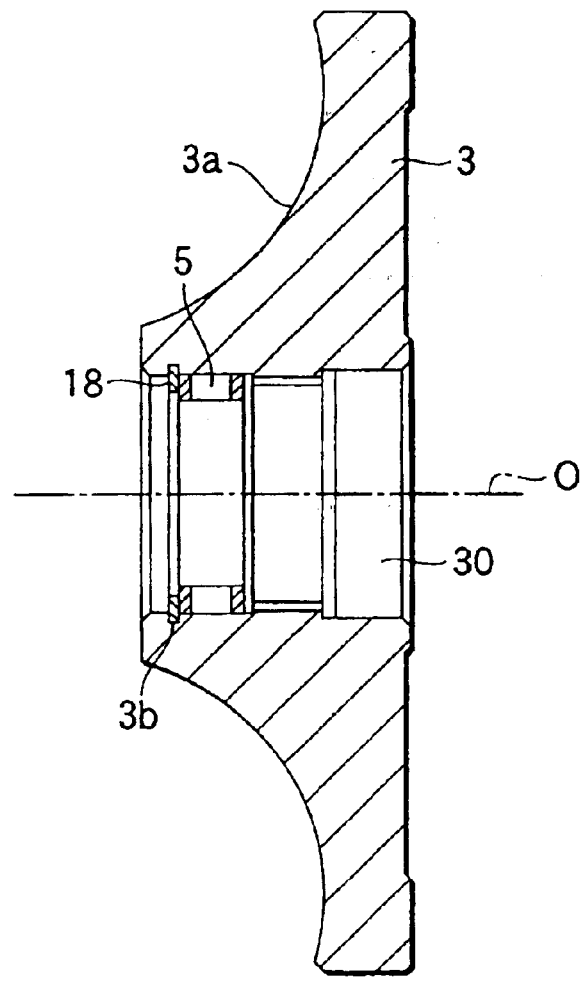
FIG. 5(a) is a side section view of an output side disk employed in the conventional toroidal-type continuously variable transmission shown.
Figure 5B:
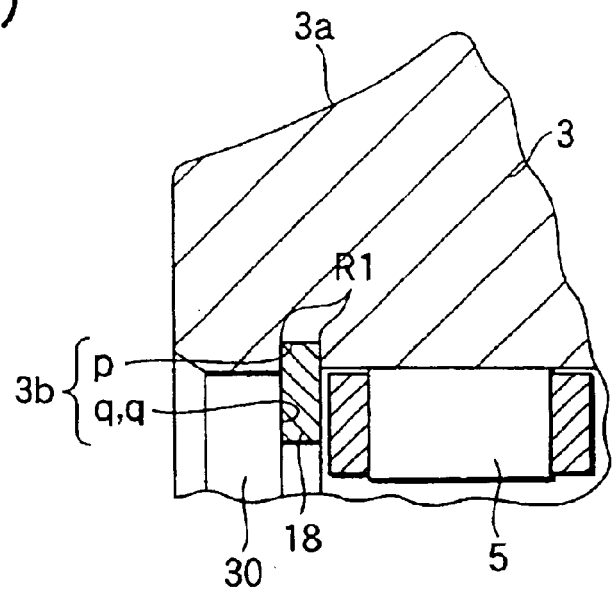
FIG. 5(b) is an enlarged section view of the output side disk shown in FIG. 5(a)
Figure 6A:
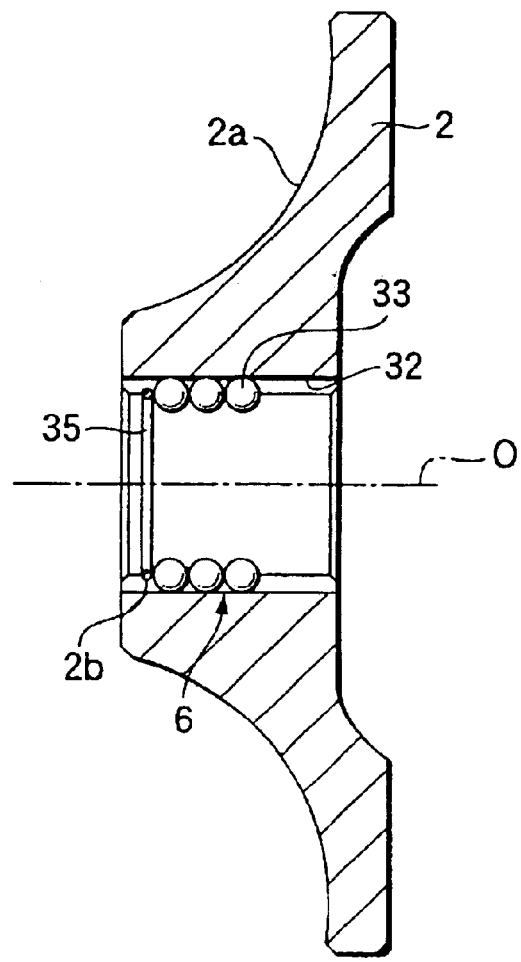
FIG. 6(a) is a side section view of an input side disk employed in the conventional toroidal-type continuously variable transmission.
Figure 6B:
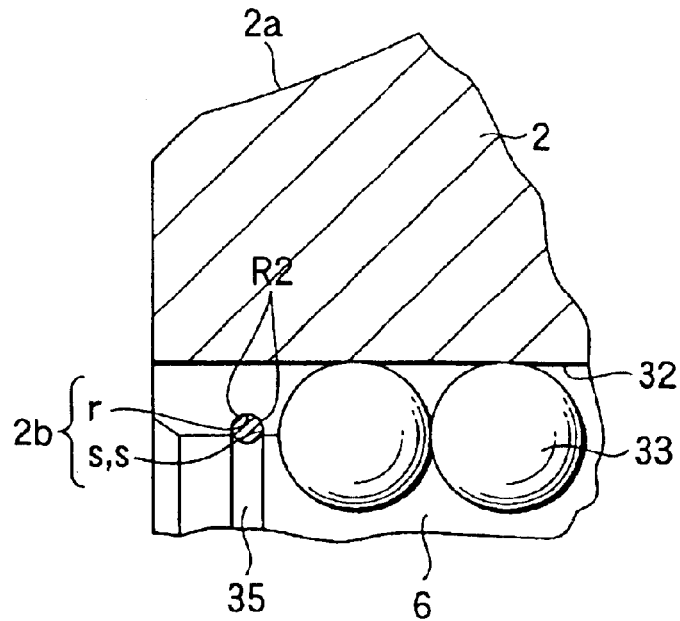
FIG. 6(b) is an enlarged section view of the input side disk shown in FIG. 6(a); and, FIG. 7 is a section view of a power roller portion of the conventional toroidal-type continuously variable transmission shown in FIG. 4 interposed between the input side disk and output side disk.

As shown enlargedly in FIG. 3(b), in the inner peripheral surface of the input side disk 2, there is formed a ring-shaped securing groove 45. Into the securing groove 45, there is fitted and secured a slippage preventive member such as a retaining ring 47 which prevents the balls 33 from shifting in the axis O direction and thus slipping out of their given positions.

The securing groove 45 comprises a bottom surface (groove bottom) 45a the section of which has a linear shape extending along the axis O, and side surfaces 45b, 45c which not only intersect at right angles to the bottom surface 45a but also extend linearly toward the penetration hole 43 of the input side disk 2. A first connecting portion R5, which connects together the bottom surface 45a and the side surface 45b situated on the ball 33 side of the securing groove 45, is formed as a surface the section of which has an arc-like shape with a large radius of curvature. On the other hand, a second connecting portion R6, which connects together the bottom surface 45a and the side surface 45c opposed to the side surface 45b of the securing groove 45, is formed as a surface the section of which has an arc-like shape with a small radius of curvature. In the present embodiment, the radius of curvature of the second connecting portion R6 is set 0.3 to 0.8 times the width t2 of the securing groove 40. That is, the radius of curvature of the first connecting portion R5 is larger than the radius of curvature of the second connecting portion R6.

Also, in the case of the retaining ring 47 to be fitted into and secured to the thus structured securing groove 45, the section shape of its insertion portion 47a to be inserted into the securing groove 45 is substantially coincident with the section shape of the securing groove 45. Therefore, the retaining ring 47 is fitted into and secured to the securing groove 45 in such a manner that the outer peripheral surface of the insertion portion 47a of the retaining ring 47 is substantially perfectly coincident with the inner peripheral surface of the securing groove 45.

Figure 7:
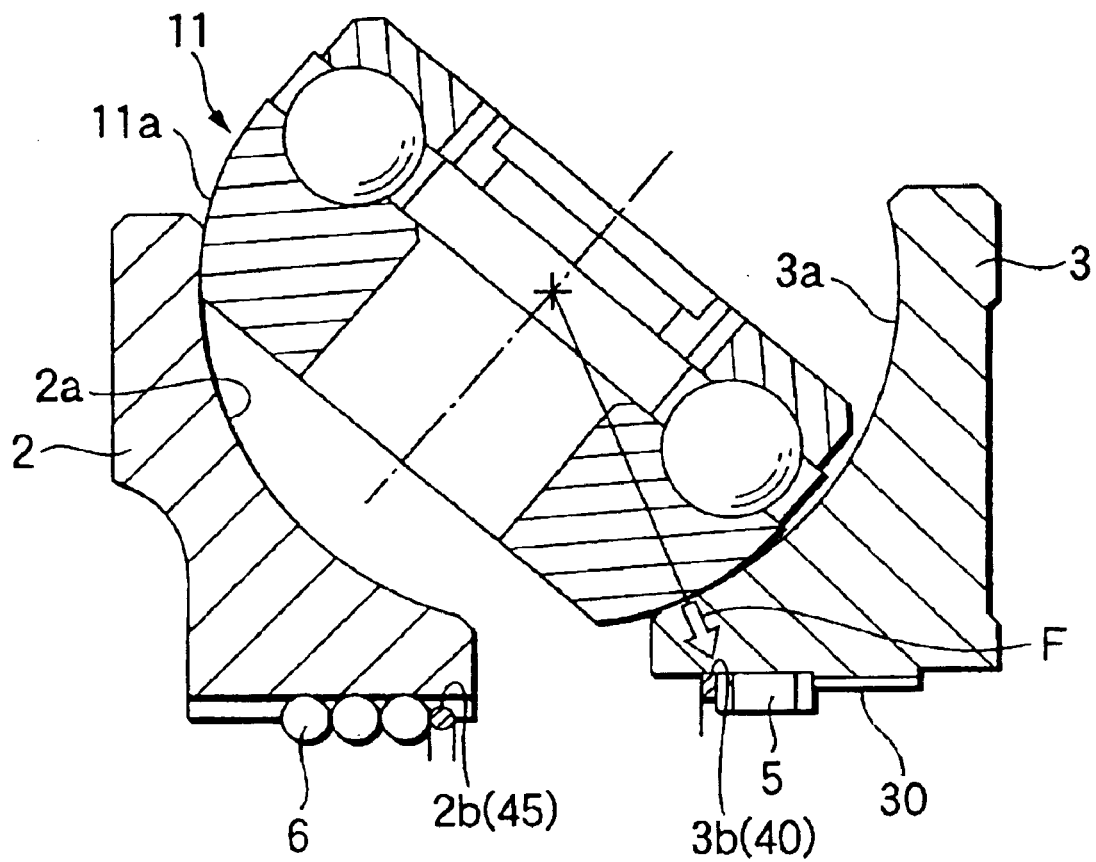

As has been described heretofore, in the present embodiment, the first connecting portion R3 of the securing groove 40 of the output side disk 3, to which the retaining ring 42 for preventing the slippage of the needle roller bearing 5 is to be secured, is formed as a surface the section of which has an arc-like shape with a large radius of curvature. Therefore, even in case where, for example, as shown in FIG. 7, in order to increase a transmission ratio, the power roller 11 is shifted and the force in the arrow mark F direction is thereby applied to the securing groove 40, the stresses acting on the securing groove 40 can be dispersed and released along the arc-shaped surface having a large radius of curvature of the first connecting portion R3 of the securing groove 40. This eases the concentration of the stresses on the first connecting portion R3 of the securing groove 40, thereby being able to enhance the yield strength of the output side disk 3.

On the other hand, in the case of the second connecting portion R4 of the securing groove 40 of the output side disk 3, since it is formed as an arc-shaped surface having a small radius of curvature, the area of the side surface 40c which intersects at right angles to the moving direction of the needle roller bearing 5 and is used to receive the retaining ring 42 when the needle roller bearing 5 is collided with the retaining ring 42, is wide. As a result of this, the retaining ring 42 is made difficult to slip out of the securing groove 40.

Also, in the present embodiment, the first connecting portion R5 of the securing groove 45 of the input side disk 2, to which the retaining ring 47 for preventing the slippage of the ball 33 is to be secured, is formed as a surface the section of which has an arc-like shape with a large radius of curvature. Therefore, stresses acting on the securing groove 45 are dispersed and released along the arc-shaped surface having a large radius of curvature of the first connecting portion R5 of the securing groove 45. This eases the concentration of the stresses on the first connecting portion R5 of the securing groove 45, thereby being able to enhance the yield strength of the input side disk 2.

On the other hand, in the case of the second connecting portion R6 of the securing groove 45 of the input side disk 2, since it is formed as an arc-shaped surface having a small radius of curvature, the area of the side surface 45c, which intersects at right angles to the moving direction of the ball 33 and is used to receive the retaining ring 47 when the ball 33 is collided with the retaining ring 47, is wide. As a result of this, the retaining ring 47 is made difficult to slip out of the securing groove 45.

By the way, in the above-mentioned embodiment, in the inner peripheral surface of the input side disk 2, there is formed the securing groove 45 and, into the securing groove 45, there is fitted and secured the retaining ring 47 serving as a slippage preventive member which prevents the ball 33 from shifting in the axis O direction and thus slipping out of its given position. However, this is not limitative but, instead of the above, a securing groove may be formed in the outer peripheral surface of the input shaft 1 and, to the thus formed securing groove, there may be secured a slippage preventive member such as a retaining ring. That is, the invention may also be applied to the present securing groove of the input shaft.

Also, according to the above-mentioned embodiment, in a toroidal-type continuously variable transmission of a double cavity type, the input side disk 2 is supported on the input shaft 1 through the ball spline 6. However, in the case of a toroidal-type continuously variable transmission of a single cavity type, the input side disk 2 can also be supported on the input shaft 1 through a needle roller bearing. And, similarly to the output side disk 3, the invention can be applied to a securing groove to which a slippage preventive member such as a retaining ring for preventing the slippage of the present needle roller bearing is to be secured.

As has been described heretofore, according to a toroidal-type continuously variable transmission of the invention, not only concentration of stresses on a securing groove, which is formed in one of input side and output side disks and also to which a needle roller bearing slippage preventive member is to be secured, can be eased to thereby be able to enhance the yield strength of the present disk, but also the slippage preventive member can be made difficult to slip out of the securing groove.

Also, according to a toroidal-type continuously variable transmission of the invention, not only concentration of stresses on a securing groove, which is formed in an output side disk and also to which a needle roller bearing slippage preventive member is to be secured, can be eased to thereby be able to enhance the yield strength of the output side disk, but also the slippage preventive member can be made difficult to slip out of the securing groove.

Further, according to a toroidal-type continuously variable transmission of the invention, not only concentration of stresses on a securing groove, which is formed in an input side disk and also to which a ball spline ball slippage preventive member is to be secured, can be eased to thereby be able to enhance the yield strength of the input side disk, but also the slippage preventive member can be made difficult to slip out of the securing groove.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A continuously variable transmission, comprising:
   an input shaft to which a rotational force is input;
   a first disk disposed concentric with said input shaft and including a penetration hole formed in a central portion thereof, said first disk acting as one of an input side disk and an output side disk, said input shaft passing through said penetration hole;
   a needle roller bearing interposed between the input shaft and the first disk for rotatably supporting said first disk;
   a slippage preventive member secured to an inner peripheral surface of said penetration hole formed in said first disk, for preventing said needle roller bearing from slipping out in an axial direction of said input shaft; and,
   a securing groove formed in the inner peripheral surface of said penetration hole formed in said first disk, for securing said slippage preventive member thereto,
   wherein said securing groove includes first and second side surfaces opposed to each other and a bottom surface interposed between the first and second side surfaces so as to define a substantially U-shape in a cross section of said securing groove, and
   wherein said securing groove further includes,
   a first connecting portion with a cross section thereof having an arcuate shape for connecting the bottom surface with one of the side surfaces that is situated on said needle roller bearing side, and
   a second connecting portion with a cross section thereof having an arcuate shape for connecting the bottom surface with the other of the side surfaces, and wherein the radius of curvature of said first connecting portion is larger than the radius of curvature of said second connecting portion.

2. The continuously variable transmission as set forth in claim 1, wherein said first disk is the output side disk.

3. The continuously variable transmission as set forth in claim 1, further comprising:
   a second disk rotatable integrally with said input shaft, wherein said first disk is the output side disk, and said second disk is the input side disk.

4. The continuously variable transmission as set forth in claim 1, wherein a cross-sectional shape of a portion of said slippage preventive member to be inserted into said securing groove is formed substantially coincident with a cross-sectional shape of said securing groove.

5. The continuously variable transmission as set forth in claim 2, wherein a cross-sectional shape of a portion of said slippage preventive member to be inserted into said securing groove is formed substantially coincident with a cross-sectional shape of said securing groove.

6. The continuously variable transmission as set forth in claim 3, wherein a cross-sectional shape of a portion of said slippage preventive member to be inserted into said securing groove is formed substantially coincident with a cross-sectional shape of said securing groove.

7. The continuously variable transmission as set forth in claim 1, wherein the radius of curvature of said second connecting portion is set 0.3 to 0.8 times a width of said securing groove in the axial direction of the first disk.

8. A continuously variable transmission, comprising:
   an input shaft to which a rotational force is input;
   an input side disk rotatable integrally with said input shaft;
   an output side disk disposed concentric with and opposed to said input side disk;
   a ball spline for supporting said input side disk on an outer peripheral surface of said input shaft, said ball spline including a first ball spline groove formed in the outer peripheral surface of said input shaft, a second ball spline groove formed in an inner peripheral surface of said input side disk, and a plurality of balls rollably interposed between said first and second ball spline grooves;
   a slippage preventive member for preventing said balls from slipping out in an axial direction of said input shaft;
   a securing groove formed in said input shaft or in said input side disk, for securing said slippage preventive member thereto,
   wherein said securing groove includes first and second side surfaces opposed to each other and a bottom surface therebetween so as to define a substantially U-shape in a cross section of said securing groove,
   wherein said securing groove includes,
   a first connecting portion with a cross section thereof having an a shape for connecting the bottom surface with one of the side surfaces that is situated on said ball spline groove side, and a second connecting portion with the section thereof having an a shape for connecting said bottom surface with the other of the side surfaces, and wherein the radius of curvature of said first connecting portion is larger than the radius of curvature of said second connecting portion.

9. The continuously variable transmission as set forth in claim 8, herein a cross-sectional shape of portion of said slippage preventive member to be inserted into said securing groove is formed substantially coincident with a cross-sectional shape of said securing groove.

10. The continuously variable transmission as set forth in claim 8, wherein the radius of curvature of said second connecting portion is set 0.3 to 0.8 times a width of said securing groove in an axial direction of the input side disk.

* * * * *